(12) United States Patent
Bastien et al.

(10) Patent No.: US 10,088,971 B2
(45) Date of Patent: Oct. 2, 2018

(54) NATURAL USER INTERFACE CAMERA CALIBRATION

(71) Applicant: Microsoft Technology Licensing, LLC, Redmond, WA (US)

(72) Inventors: David Bastien, Kirkland, WA (US); Kevin Alan Kennedy, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 566 days.

(21) Appl. No.: 14/566,410

(22) Filed: Dec. 10, 2014

(65) Prior Publication Data

US 2016/0170603 A1   Jun. 16, 2016

(51) Int. Cl.
*G06F 3/0481* (2013.01)
*G02B 27/01* (2006.01)
(Continued)

(52) U.S. Cl.
CPC ..... *G06F 3/04815* (2013.01); *G02B 27/0172* (2013.01); *G06F 3/005* (2013.01);
(Continued)

(58) Field of Classification Search
None
See application file for complete search history.

(56) References Cited

U.S. PATENT DOCUMENTS 7,957,581 B2 * 6/2011 Wu .......................... G06T 7/593
348/187

2007/0038944 A1 * 2/2007 Carignano .............. G06T 15/20
715/757
(Continued)

FOREIGN PATENT DOCUMENTS

| EP | 0866419 A2 | 9/1998 |
| EP | 1594040 A2 | 11/2005 |
| WO | 2012154878 A1 | 11/2012 |

OTHER PUBLICATIONS

Baricevic D. et al., "User-Perspective Augmented Reality Magic Lens from Gradients," In Proceedings of the 20$^{th}$ ACM Symposium on Virtual Reality Software and Technology, Nov. 11, 2014, Edinburgh, UK 10 Pages.*
(Continued)

*Primary Examiner* — Edemio Navas, Jr.
(74) *Attorney, Agent, or Firm* — Alleman Hall Creasman & Tuttle LLP

(57) ABSTRACT

A method of calibrating a six-degree-of-freedom (6DoF) pose of a natural user interface (NUI) camera relative to a display is provided. Calibration video imaging an environment from a calibration perspective, which sites the display and one or more features, is received from the NUI camera or a calibration camera. A three-dimensional map of the environment, which defines a 6DoF pose of the display and a three-dimensional location of each of the one or more features, is modeled from the calibration video. Primary video imaging the environment from an operation perspective, which sites the one or more features, is received from the NUI camera. A 6DoF pose of the NUI camera is found within the three-dimensional map of the environment based on the operation perspective view of the one or more features.

15 Claims, 7 Drawing Sheets

(51) Int. Cl.
| | |
|---|---|
| G06F 3/00 | (2006.01) |
| G06F 3/01 | (2006.01) |
| G06F 3/03 | (2006.01) |
| G06T 15/55 | (2011.01) |
| G06T 19/00 | (2011.01) |
| G06T 7/00 | (2017.01) |
| H04N 13/00 | (2018.01) |
| H04N 13/207 | (2018.01) |
| H04N 13/246 | (2018.01) |
| H04N 13/254 | (2018.01) |
| H04N 13/271 | (2018.01) |
| H04N 13/02 | (2006.01) |
| G06T 7/80 | (2017.01) |
| G06T 7/73 | (2017.01) |

(52) U.S. Cl.
CPC .............. *G06F 3/011* (2013.01); *G06F 3/017* (2013.01); *G06F 3/0304* (2013.01); *G06T 7/73* (2017.01); *G06T 7/80* (2017.01); *G06T 15/55* (2013.01); *G06T 19/006* (2013.01); *H04N 13/0207* (2013.01); *H04N 13/0246* (2013.01); *H04N 13/0253* (2013.01); *H04N 13/0271* (2013.01); *H04N 13/207* (2018.05); *H04N 13/246* (2018.05); *H04N 13/254* (2018.05); *H04N 13/271* (2018.05); *G02B 2027/0178* (2013.01); *G06F 2203/012* (2013.01); *G06T 2207/10024* (2013.01); *G06T 2207/10028* (2013.01); *G06T 2207/30196* (2013.01); *G06T 2207/30244* (2013.01); *H04N 2013/0081* (2013.01)

(56) References Cited

U.S. PATENT DOCUMENTS

| | | | | |
|---|---|---|---|---|
| 2009/0209343 A1* | 8/2009 | Foxlin | .................... | G07F 17/32 463/36 |
| 2011/0193939 A1 | 8/2011 | Vassigh et al. | | |
| 2012/0194420 A1 | 8/2012 | Osterhout et al. | | |
| 2012/0257035 A1 | 10/2012 | Larsen | | |
| 2013/0120224 A1* | 5/2013 | Cajigas | .................... | G09G 5/00 345/8 |
| 2013/0335405 A1* | 12/2013 | Scavezze | ................ | G06T 19/20 345/419 |
| 2014/0028548 A1* | 1/2014 | Bychkov | ................ | G06F 3/017 345/156 |
| 2014/0063060 A1* | 3/2014 | Maciocci | ................ | G06F 3/011 345/633 |
| 2014/0184494 A1 | 7/2014 | Burachas | | |
| 2015/0062010 A1* | 3/2015 | Lin | ........................... | G06T 7/75 345/157 |

OTHER PUBLICATIONS

ISA European Patent Office, International Search Report and Written Opinion Issued in PCT Application No. PCT/US2015/062925, dated Mar. 14, 2017, WIPO, 22 Pages.

Baricevic D. et al., "User-Perspective Augmented Reality Magic Lens From Gradients," In Proceedings of the 20th ACM Symposium on Virtual Reality Software and Technology, Nov. 11, 2014, Edinburgh, UK, 10 pages.

Kim J. et al., "Sensor-Display Registration for 3D Physical User Interaction using a Flat-Panel Display," In Proceedings of the 2014 22nd International Conference on Pattern Recognition, Aug. 24, 2014, Stockholm, Sweden, 6 pages.

Hilliges O. et al., "HoloDesk : Direct 3D Interactions with a Situated See-Through Display," In Proceedings of the 2012 ACM Annual Conference on Human Factors in Computing Systems, May 5, 2012, Austin, Texas, 10 pages.

Nickel K. et al., "Visual recognition of pointing gestures for human-robot interaction," In Journal of Image and Vision Computing, vol. 25, Issue 12, Dec. 3, 2007, 10 pages.

Demirdjian D. et al.,"3-D Articulated Pose Tracking for Untethered Diectic Reference," In Proceedings of the 4th IEEE International Conference on Multimodal Interfaces, Oct. 14, 2002, Washington, DC, USA, 6 pages.

* cited by examiner

NATURAL USER INTERFACE CAMERA CALIBRATION

BACKGROUND

Natural user interfaces allow for a user to provide gesture input to a computing device.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A method of calibrating a six-degree-of-freedom (6DoF) pose of a natural user interface (NUI) camera relative to a display is provided. Calibration video imaging an environment from a calibration perspective, which sites the display and one or more features, is received from the NUI camera or a calibration camera. A three-dimensional map of the environment, which defines a 6DoF pose of the display and a three-dimensional location of each of the one or more features, is modeled from the calibration video. Primary video imaging the environment from an operation perspective, which sites the one or more features, is received from the NUI camera. A 6DoF pose of the NUI camera is found within the three-dimensional map of the environment based on the operation perspective view of the one or more features.

DETAILED DESCRIPTION

The present disclosure is directed to methods for calibrating a natural user interface (NUI) camera for a computing system. In particular, an environment including a display and an NUI camera is imaged, and a three-dimensional map of the environment is constructed. Within the three-dimensional map, the locations and 6-degrees-of-freedom (6DoF) poses of the display and NUI camera are established relative to the environment and relative to each other.

Figure 1:
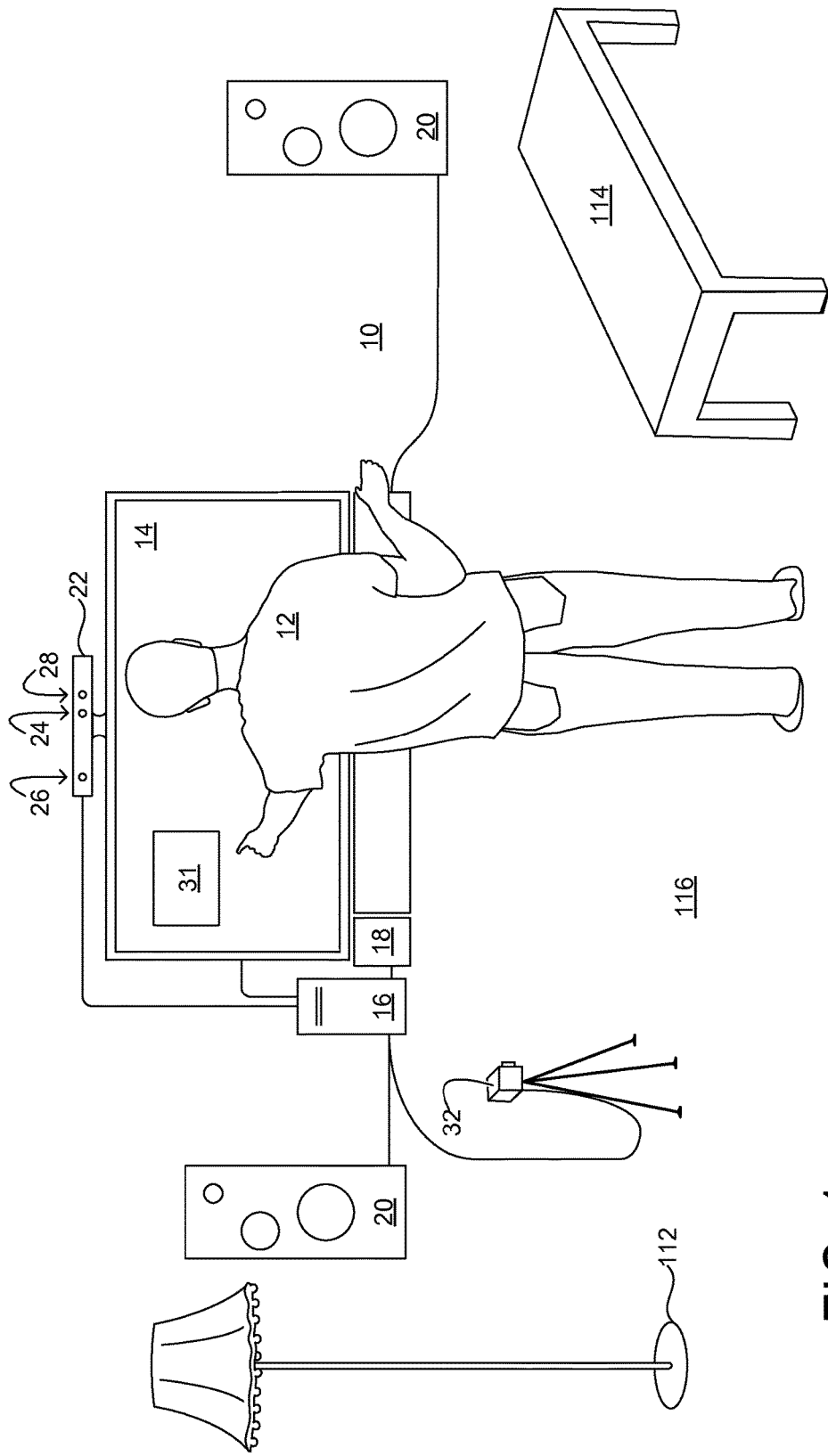
FIG. 1 shows an example environment for a computing system including a natural user interface camera.

FIG. 1 shows an environment 10, where a user 12 is standing in front of large-format, flat screen display 14. Display 14 may be a stereoscopic 3D display in some embodiments, or a conventional 2D display in others. Compute system 16 is operatively coupled to the display and to other components, such as audio-video (A/V) receiver 18 and loudspeakers 20. In one embodiment, the compute system may be a game console. In another embodiment, the compute system may be a multipurpose personal computer or workstation. Additional aspects of the compute system are described hereinafter.

In some embodiments, user 12 may interact with compute system 16 and associated components via conventional input devices—a keyboard, touch-screen, mouse, game-system controller, and/or wireless remote, for example. Alternatively, or in addition, the compute system may respond to 'natural user input' (NUI), where the user's speech, hand gestures, and/or eye movements are sensed, interpreted, and used to control the compute system.

To this end, compute system 16 in FIG. 1 is operatively coupled to machine vision system 22. The illustrated machine vision system includes an infrared (IR) or near IR (NIR) illumination source 24, a depth camera 26, and a flat-image camera 28. The machine vision system may also include a microphone 30 (not shown in FIG. 1) for receiving speech or other audible input from user 12.

Depth camera 26 may be configured to acquire a time-resolved sequence of depth maps of user 12 and other aspects of environment 10. As used herein, the term 'depth map' refers to an array of pixels registered to corresponding regions $(X_i, Y_i)$ of an imaged scene, with a depth value $Z_i$ indicating, for each pixel, the depth of the corresponding region. 'Depth' is defined as a coordinate parallel to the optical axis of the depth camera, which increases with increasing distance from the depth camera. Operationally, a depth camera may be configured to acquire 2D image data, from which a depth map is obtained via downstream processing.

In general, the nature of depth camera 26 may differ in the various embodiments of this disclosure. In one embodiment, brightness or color data from two, stereoscopically oriented imaging arrays in the depth camera may be co-registered and used to construct a depth map. In other embodiments, illumination source 24 may be configured to project onto the subject a structured illumination pattern comprising numerous discrete features—e.g., lines or dots. An imaging array in the depth camera may be configured to image the structured illumination reflected back from the subject. Based on the spacings between adjacent features in the various regions of the imaged subject, a depth map of the subject may be constructed. In still other embodiments, the illumination source may project pulsed IR or NIR illumination towards the subject. A pair of imaging arrays in the depth camera may be configured to detect the pulsed illumination reflected back from the subject. Both arrays may include an electronic shutter synchronized to the pulsed illumination, but the integration times for the arrays may differ, such that a pixel-resolved time-of-flight of the pulsed illumination, from the illumination source to the subject and then to the arrays, is discernible based on the relative amounts of light received in corresponding elements of the two arrays.

Through a suitable objective-lens system, flat-image camera 28 detects light over a range of field angles, mapping such angles to corresponding pixels of a rectangular pixel array. In one embodiment, the flat-image camera may detect the light in a plurality of wavelength channels—e.g., red, green, blue, etc.—each associated with a subset of the pixels of the array. Alternatively, a monochromatic flat-image camera may be used, which images visible, IR, NIR, and/or ultraviolet (UV) light in grayscale. Color or brightness values for all of the pixels exposed in the flat-image camera constitute collectively a digital image. In some embodiments, depth camera 26 and flat-image camera 28 are arranged with parallel optical axes oriented in the same direction.

User 12 may be tracked within environment 10 using depth camera 26 so that movements of user 12 may be interpreted by compute system 16 as controls without requiring user 12 to hold any specific motion detecting devices or wear any specific markers. In one example, user 12 may target a display object 31 appearing on display 14 by merely pointing at the display object. In order to allow a user to provide input by pointing directly at a display object, the six-degrees-of-freedom (6DoF=X, Y, Z, pitch, roll, yaw) poses of the display and machine vision system must be known relative to each other, relative to environment 10, and relative to user 12.

In order to map the 6DoF pose of the display within environment 10, two or more images of environment 10 may be taken from different perspectives, provided at least one of the images includes display 14. In some examples, this may be accomplished by imaging environment 10 while depth camera 26 is placed in a calibration perspective, then moving depth camera 26 to an operation perspective (e.g., the perspective illustrated in FIG. 1) and re-imaging environment 10. In other examples, a separate calibration camera may be used to image environment 10 from a calibration perspective. For example, an auxiliary camera 32 may be communicatively coupled to compute system 16. In another example, user 12 may image environment 10 using a camera disposed within a smart-phone or tablet computing device. In yet another example, environment 10 may be imaged by a camera disposed within an augmented-reality device, such as a head-mounted computing system worn by user 12.

Figure 2:
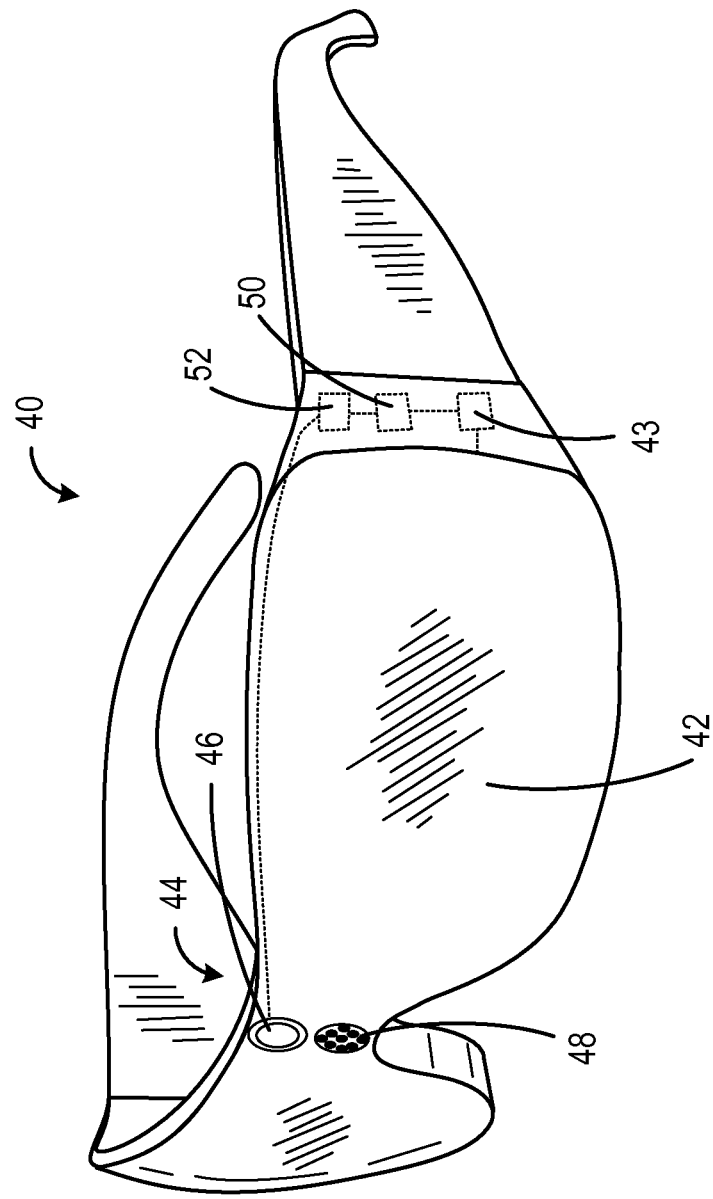
FIG. 2 shows an example head-mounted display system.

FIG. 2 depicts an example head-mounted display system 40. The head-mounted display system 40 takes the form of a pair of wearable glasses or goggles. The head-mounted display system 40 includes a see-through display 42 that may be configured to visually augment an appearance of a physical environment to a user viewing the physical environment through the see-through display. Head-mounted display system 40 may be configured to augment the reality of a real-world environment.

For example, the appearance of the real-world background may be augmented by graphical content that may be presented with the see-through display 42 such that the graphical content appears to be intermixed with the real-world background. In particular, an image production system 43 may be configured to display an image of a virtual object with the see-through display 42.

In some configurations, the head mounted display system may be an additive display system in which holographic light may be displayed on the see-through display. For example, one or more partially transparent pixels can emit light to a user's eye. The user can view real-world objects through and/or around the pixel, but the emitted light can seemingly illuminate the background objects viewed through and/or around the pixel.

The head-mounted display system 40 includes an optical sensor system 44 that may include one or more optical sensors. In one example, the optical sensor system 44 includes an inward facing optical sensor 46 and an outward facing optical sensor 48. The inward facing optical sensor may be configured to perform gaze detection or other analysis on the user's eyes. The outward facing optical sensor may be configured to detect the real-world background from a similar vantage point (e.g., line of sight) as observed by the user through see-through display 42. In some configurations, the sensor subsystem may include two or more different inward and/or outward facing optical sensors (e.g., outward facing flat image camera and outward facing depth camera).

The head-mounted display system 40 may further include a position sensor system 50 that may include one or more position sensors (e.g., accelerometer(s), gyroscope(s), magnetometer(s), global positioning system(s), multilateration tracker(s), etc.) that output position sensor information useable to assess a position, orientation, and/or movement of the relevant sensor.

Optical sensor information received from the optical sensor system 44 and/or position sensor information received from position sensor system 50 may be used to assess a position and orientation of the vantage point of the see-through display relative to other environmental objects. In some configurations, the position and orientation of the vantage point may be characterized with six degrees of freedom (e.g., world-space X, Y, Z, pitch, roll, yaw). The vantage point may be characterized globally or independent of the real-world background. The position and/or orientation may be determined with an on-board computing system (e.g., on-board computing system 52) and/or an off-board computing system (e.g., computer system 16 of FIG. 1).

Furthermore, the optical sensor information and the position sensor information may be used by a computing system to perform analysis of the real-world background, such as depth analysis, surface reconstruction, environmental color and lighting analysis, or other suitable operations. The optical and positional sensor information may be used to create a virtual model of the real-world background. In some configurations, the position and orientation of the vantage point may be characterized relative to this virtual space. Moreover, the virtual model may be used to determine positions of virtual objects in the virtual space.

Figure 3:
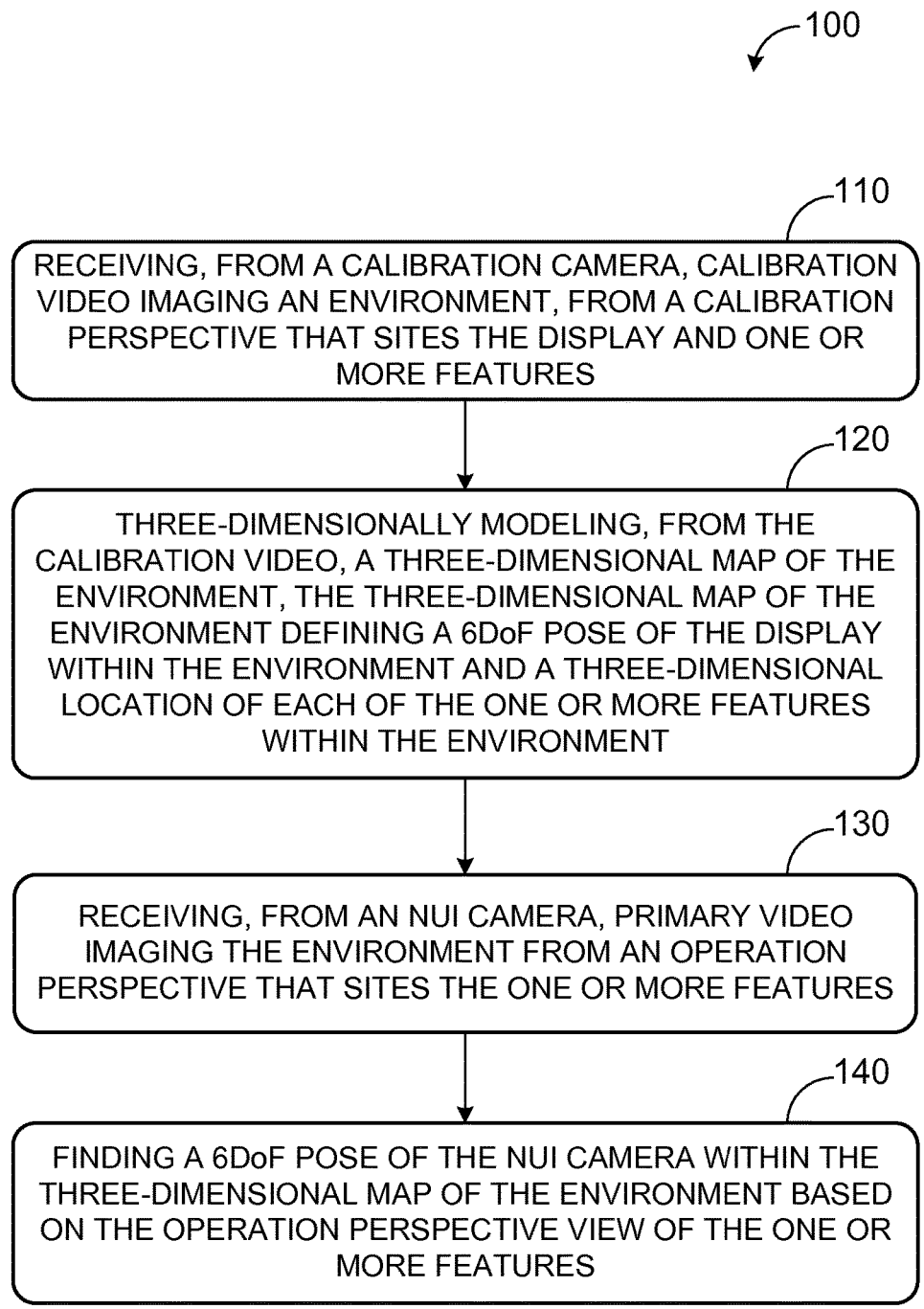
FIG. 3 shows an example method for calibrating a six-degrees-of-freedom pose of a natural user interface camera relative to a display

FIG. 3 shows an example method 100 for calibrating a six-degrees-of-freedom (6DoF) pose of a natural user interface (NUI) camera relative to a display. At 110, method 100 includes receiving, from a calibration camera, calibration video imaging an environment from a calibration perspective that sites the display and one or more features. As described above, the calibration camera may be an auxiliary camera, such as auxiliary camera 32, a camera disposed within an augmented reality device, such as outward facing optical sensor 48, a camera disposed within a smart-phone or tablet computer, or other suitable camera. Alternatively, the NUI camera may be moved to a calibration perspective and used to complete the calibration. In either case, the camera used to complete the calibration may be configured to acquire 2D image data and/or 3D image data.

The one or more features may comprise one or more objects, aspects, or characteristics of environment 10 which may be represented by one or more points on an assembled depth map of environment 10. The one or more features may be static features, such that a location of the feature is unchanged during the calibration process. For example, objects within environment 10, such as a particular aspect of lamp 112 or bench 114 may be used as features. All or part of an aspect of environment 10, such as floor plane 116, walls, ceilings, etc. may be used as features. Various image processing strategies may be used to identify features suitable for 6DoF pose calibration (e.g., processing to derive edge maps, intensity plots, and/or point clouds).

Display 14 may be configured to present a calibration image visible to the calibration camera. The calibration image may be presented such that calibration video of the display may be used to determine characteristics of the display. For example, the size, shape, and/or resolution of the display may be determined based at least in part on the appearance of the calibration image in the calibration video. Further, the position and tilt of the display relative to the calibration camera may be determined based at least in part on the keystone of the calibration image in the calibration video. The calibration image may be static or may be changed progressively. By changing the calibration image, the lightfall from the display may change accordingly. Changes in shadows or reflections of environmental features may thus be recorded in the calibration video.

At 120, method 100 includes three-dimensionally modeling, from the calibration video, a three-dimensional map of the environment, the three-dimensional map of the environment defining a 6DoF pose of the display within the environment and a three-dimensional location of each of the one or more features within the environment.

At 130, method 100 includes receiving, from the NUI camera, primary video imaging the environment from an operation perspective that sites the one or more features. The operation perspective may be from a location and pose of the NUI camera from which input to the computing system will be received during operation of the computing system. The primary video may be recorded simultaneously with the calibration video, or may be recorded separately.

The calibration camera optionally may include two or more reference markings visible to the NUI camera. The reference markers may indicate the position and direction of the calibration camera relative to the NUI camera and relative to the environment. In examples where the calibration camera includes a display screen, such as when the calibration camera is included in a smartphone or tablet computer, the display screen may be configured to present a reference image visible to the NUI camera. Based on the dimensions and resolution of the display screen, the distance between the calibration camera and NUI camera may be determined.

At 140, method 100 includes finding a 6DoF pose of the NUI camera within the three-dimensional map of the environment based on the operation perspective view of the one or more features. In this way, the 6DoF poses of the NUI camera and display are known relative to each other and relative to the environment. As one example, the 6DoF pose of the NUI camera may be derived from the distance and angle from the NUI camera to one or more of the mapped features.

As introduced above, the NUI camera may be used to capture both the calibration video as well as the primary video. For example, the method may include receiving, from the NUI camera, calibration video imaging the environment from a calibration perspective that sites the display and one or more features. The method may further include receiving, from the NUI camera, primary video imaging the environment from an operation perspective that sites the one or more features. The primary video may be recorded separately from the calibration video. The NUI camera may be coupled to one or more motion sensors, such that movement of the camera from the calibration perspective to the operation perspective is tracked. Spatial information from the camera tracking may be used to determine the location and pose of the camera relative to the environment and the display.

Other methods of calibrating a 6DoF pose of an NUI camera relative to a display may also be used. In some examples, the NUI camera may be configured to be utilized from an operational perspective that is fixed to the 6DoF pose of the display. For example, the NUI camera may be located in a bezel of the display. In such examples, the imaging of one or more features of the environment may be sufficient to determine the 6DoF pose of the NUI camera. For example, using the floor plane as a feature, the height and angle of the sensor may be determined. In some scenarios, characteristics of the display, such as the display dimensions and resolution may be known by the computing system. For some displays, the display screen may be assumed to be parallel with gravity.

User input may also be used to calibrate the 6DoF pose of an NUI camera relative to a display. For example, the NUI camera may record video of the user pointing to features on the display, such as the display corners, or objects that are displayed as part of a calibration procedure. The user may be instructed to move display objects appearing on the display relative to each other by pointing and dragging objects. The user may point at the screen with a finger or other body part, or may point at the screen with an implement, such as a laser pointer or telescoping antenna. In some examples, the user may aim a camera or telescoping lens at features on the display, or may hold up a mirror including a bezel visible to the NUI camera. When such implements are used, they optionally may include markers that the NUI camera can image to resolve a 6DoF pose of the implement relative to the NUI camera. If the operational perspective of the NUI camera is altered, the calibration process may be repeated from the new operational perspective, or the new NUI camera location may be derived based on the camera's new view of the one or more features of the environment.

Figure 4:
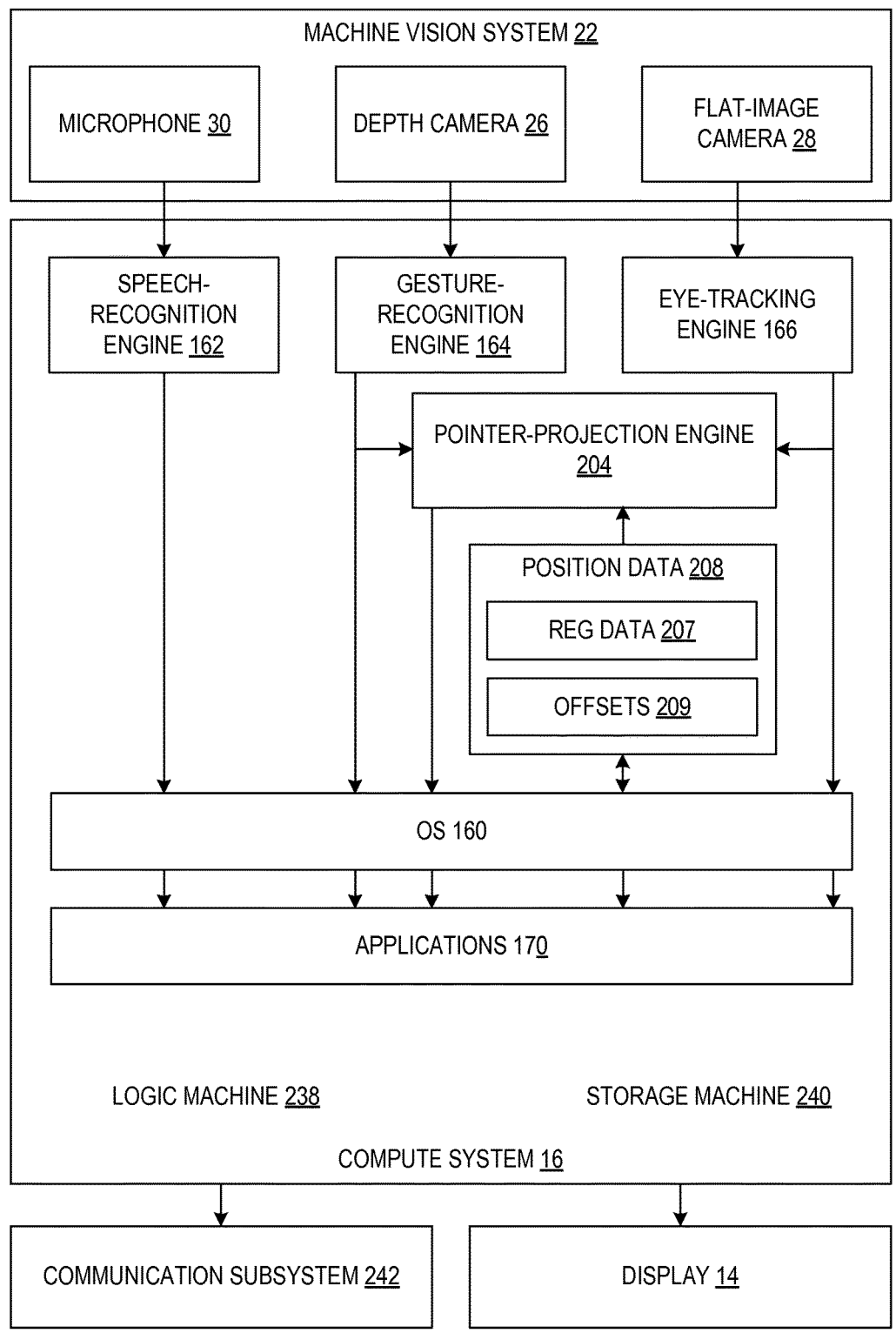
FIG. 4 shows aspects of an example compute system.

As shown in FIG. 4, sensory data from machine vision system 22 is processed by one or more NUI engines of compute system 16 to reveal actionable user input. Such input is parsed by operating system (OS) 160 or by application-level code, thereby controlling the operation of the compute system. In the embodiment of FIG. 4, compute system 16 includes a speech-recognition engine 162, a gesture-recognition engine 164, and an eye-tracking engine 166.

Speech-recognition engine 162 is configured to process audio data from microphone 30, to recognize words or phrases in the user's speech, and to generate corresponding actionable input to OS 160 or applications 170. Gesture-recognition engine 164 is configured to process at least the depth video (i.e., a time-resolved sequence of depth maps) from machine-vision system 22, to identify one or more human subjects in the depth video, to compute various geometric (e.g., skeletal) features of the subjects identified, and to gather from the geometric features various postural or gestural information to be used as NUI.

In one non-limiting embodiment, gesture-recognition engine 164 identifies at least a portion of one or more human subjects in the depth video. Through appropriate depth-image processing, a given locus of a depth map may be recognized as belonging to a human subject. In a more particular embodiment, pixels that belong to a human subject may be identified (e.g., by sectioning off a portion of a depth map that exhibits above-threshold motion over a suitable time scale) and a generalized geometric model of a human being may be derived from those pixels.

In one embodiment, each pixel of a depth map may be assigned a person index that identifies the pixel as belonging to a particular human subject or non-human element. As an example, pixels corresponding to a first human subject can be assigned a person index equal to one, pixels corresponding to a second human subject can be assigned a person index equal to two, and pixels that do not correspond to a human subject can be assigned a person index equal to zero. Person indices may be determined, assigned, and saved in any suitable manner.

Gesture-recognition engine 164 also may make the determination as to which human subject (or subjects) will provide user input to compute system 16—i.e., which will be identified as the user. In some embodiments, a human subject may be selected as the user based on proximity to display 14 or depth camera 26, and/or position in a field of view of the depth camera. More specifically, the user selected may be the human subject closest to the depth camera or nearest the center of the field of view of the depth camera.

Gesture-recognition engine 164 also may process posture information from the user. The posture information is derived computationally from the depth video. In some embodiments, additional sensory input—e.g., image data from a flat-image camera 28 or audio data from microphone 30—may be processed along with the posture information.

In some embodiments, gesture-recognition engine 164 may be configured to analyze the pixels of a depth map that correspond to the user, in order to determine what part of the user's body each pixel corresponds to. A variety of different body-part assignment techniques can be used to this end. In one example, each pixel of the depth map with an appropriate person index (vide supra) may be assigned a body-part index. The body-part index may include a discrete identifier, confidence value, and/or body-part probability distribution indicating the body part or parts to which that pixel is likely to correspond.

In some embodiments, machine-learning may be used to assign each pixel a body-part index and/or body-part probability distribution. The machine-learning approach analyzes a user with reference to information learned from a previously trained collection of known poses. During a supervised training phase, for example, a variety of human subjects may be observed in a variety of poses; trainers provide ground truth annotations labeling various machine-learning classifiers in the observed data. The observed data and annotations are then used to generate one or more machine-learned algorithms that map inputs (e.g., depth video) to desired outputs (e.g., body-part indices for relevant pixels).

Figure 5:
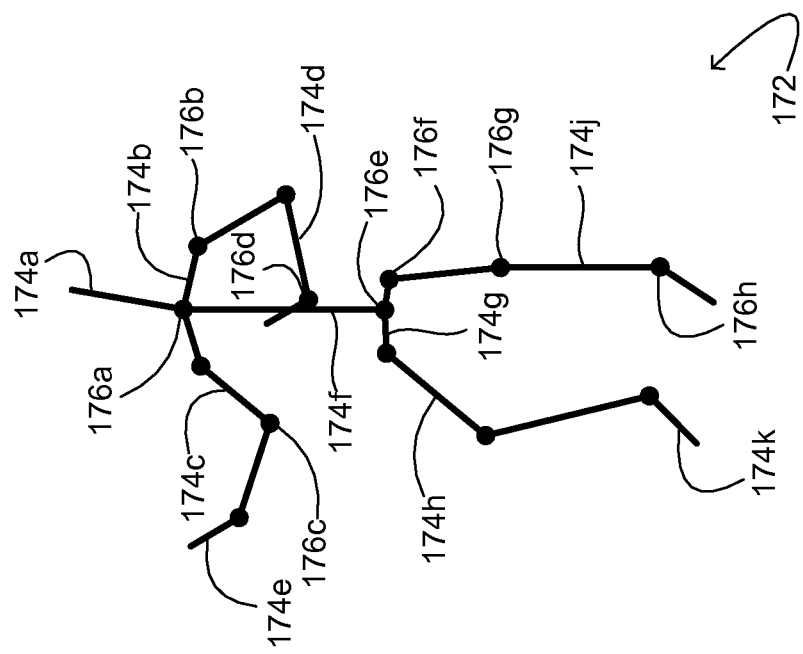
FIG. 5 shows aspects of an example virtual skeleton.

Thereafter, a virtual skeleton is fit to the pixels of depth video that correspond to the user. FIG. 5 shows an example virtual skeleton 172. The virtual skeleton includes a plurality of skeletal segments 174 pivotally coupled at a plurality of joints 176. In some embodiments, a body-part designation may be assigned to each skeletal segment and/or each joint. In FIG. 5, the body-part designation of each skeletal segment 174 is represented by an appended letter: A for the head, B for the clavicle, C for the upper arm, D for the forearm, E for the hand, F for the torso, G for the pelvis, H for the thigh, J for the lower leg, and K for the foot. Likewise, a body-part designation of each joint 176 is represented by an appended letter: A for the neck, B for the shoulder, C for the elbow, D for the wrist, E for the lower back, F for the hip, G for the knee, and H for the ankle. Naturally, the arrangement of skeletal segments and joints shown in FIG. 5 is in no way limiting. A virtual skeleton consistent with this disclosure may include virtually any type and number of skeletal segments and joints.

Figure 6:
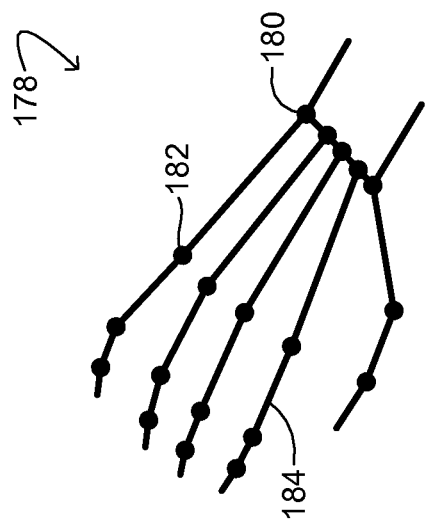
FIG. 6 shows aspects of a hand portion of an example virtual skeleton.

In a more particular embodiment, point clouds (portions of a depth map) corresponding to the user's hands may be further processed to reveal the skeletal substructure of the hands. FIG. 6 shows an example hand portion 178 of a user's virtual skeleton 172. The hand portion includes wrist joints 180, finger joints 182 and adjoining finger segments 184.

Via any suitable minimization approach, the lengths of the skeletal segments and the positions and rotational angles of the joints may be adjusted for agreement with the various contours of a depth map. In this way, each joint is assigned various parameters—e.g., Cartesian coordinates specifying joint position, angles specifying joint rotation, and additional parameters specifying a conformation of the corresponding body part (hand open, hand closed, etc.). The virtual skeleton may take the form of a data structure including any, some, or all of these parameters for each joint. This process may define the location and posture of the imaged human subject. Some skeletal-fitting algorithms may use the depth data in combination with other information, such as color-image data and/or kinetic data indicating how one locus of pixels moves with respect to another. In the manner described above, a virtual skeleton may be fit to each of a sequence of frames of depth video. By analyzing positional change in the various skeletal joints and/or segments, the corresponding movements—e.g., gestures or actions of the imaged user—may be determined.

The foregoing description should not be construed to limit the range of approaches usable to construct a virtual skeleton 172, for a virtual skeleton may be derived from a depth map in any suitable manner without departing from the scope of this disclosure. Moreover, despite the advantages of using a virtual skeleton to model user 12, even this aspect is by no means necessary. In lieu of a virtual skeleton, raw point-cloud data or other machine-readable models may be used to provide suitable posture information.

The three-dimensional map of the environment and three-dimensional skeleton map of the user may be used to allow the user to interact with a compute system simply by pointing at the display. In one example method, compute system 16 may receive primary video from a 6DoF calibrated machine vision system 22 imaging user 12 in environment 10, and may determine a three-dimensional skeleton map of the user relative to the three-dimensional map of the environment based on the primary video. Compute system 16 may identify three-dimensional locations of one or more body parts of the user relative to the display.

Figure 7A:
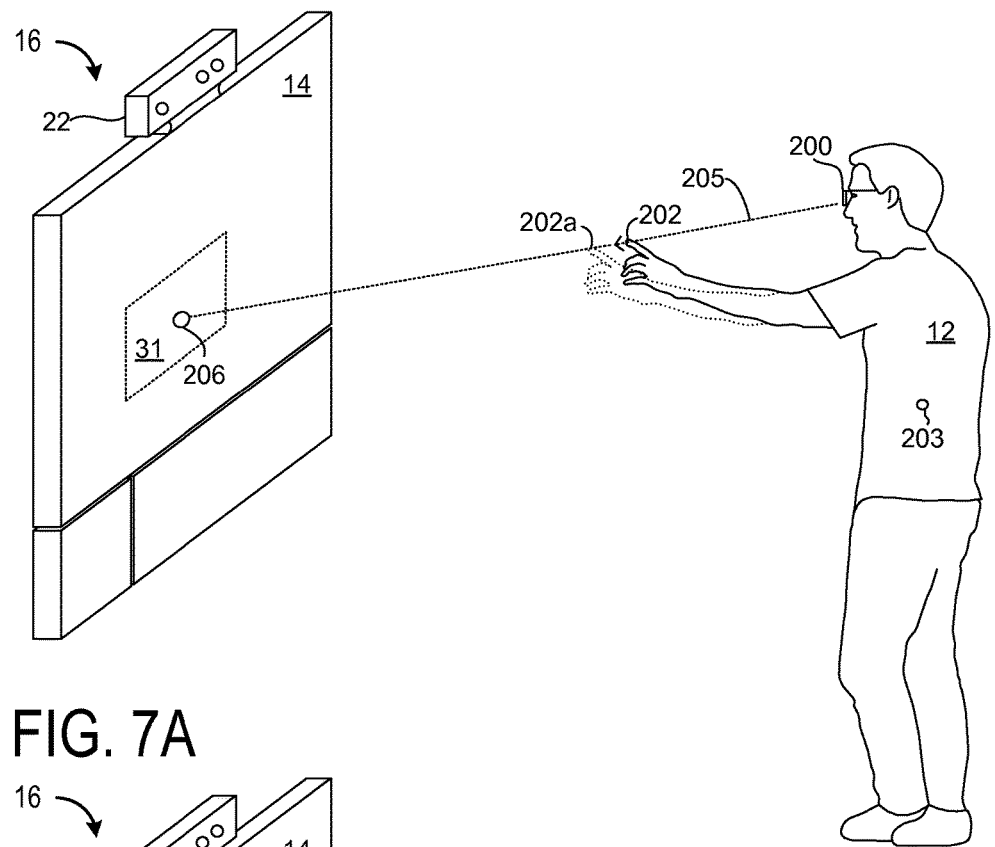
FIG. 7A shows a user targeting a display via line-of-sight pointing.

FIG. 7A shows one example of a user 12 pointing at display 14. In this example, the user's eye is designated as first body part 200. The position of the user's eye may be determined by eye-tracking engine 166 and/or gesture recognition engine 164. For example, eye-tracking engine 166 may determine the position of the user's eye based on the center point of the user's eye, the center point of the user's pupil, and/or gesture recognition engine 164 may estimate the location of the eye based on the location of the head-joint of the virtual skeleton. Eye-tracking engine 166 may be calibrated to determine a dominant eye for each user in order to select an eye as first body part 200. In this example, the user's finger is designated as second body part 202, but in other examples, the second body part may be a hand of the user. It may also be a wand or stylus, a combination of fingers, a portion of a glove, a toe, foot, shoe, or any other suitable object. The position of second body part 202 may be determined based on a single hand-joint position of the virtual skeleton, along with an indication from gesture-recognition engine 164 as to whether the hand is open or closed. Further, the body of user 12 may be assigned a center point 203 designating the user's torso, or center of gravity, for example.

Referring to FIGS. 4 and 7A, pointer-projection engine 204 receives gesture information from gesture-recognition engine 164, which includes the 3D coordinates of second body part 202. The pointer-projection engine also receives the 3D coordinates of first body part 200 (the user's eye) from eye-tracking engine 166. The pointer-projection engine is configured, in effect, to extend a ray 205 with an endpoint at the location of the first body part and passing through the location of the second body part. Ray 205 may be extended to display 14. The intersection point 206 optionally may be indicated on the display in the form of a cursor, icon, or other suitable display object. This line of sight may be used to identify a targeted object on display 14. As an example, the intersection point is used to compute pointer-projection coordinates ($X_{pp}$, $Y_{pp}$) relative to a corner of the display, which is furnished to OS 160 in the form of registration data 207.

Various graphical display objects 31 may be presented on display 14. Such objects may include windows, photos, text boxes, icons, and UI control elements, for example. The coordinates of each object on the display are stored (referring to FIG. 2) in position data 208, which is accessible to OS 160. The position data may include X, Y offsets 209 of opposite corners of each object relative to a given corner of the viewable area of the display. In embodiments where display 14 is a stereoscopic or 3D display, a depth offset Z may also be specified. Position data 208 also includes registration data 207 for display 14. The registration data may include coordinates defining the physical size, position, and orientation of the viewable area of the display—e.g., X, Y, and Z for each corner of the active display area.

The offset 209 of display object 31 may then be compared to the registration data for intersection point 206. Display object 31 may be targeted when intersection point 206 is coincident with all or part of display object 31. Targeting of display object 31 may be indicated visually, such as by altering the appearance of the display object, aurally, or by other suitable means. Once an object is targeted, user 12 may signal further action to be taken on the object. One or more of the NUI engines of compute system 16 may be configured to detect the user's intent to act on the targeted object. For example, after an object is targeted, the user may signal intent to select the object by moving second body part 202 towards the display screen (indicated at 202a). For example, display object 31 may be selected responsive to movement of second body part 202 towards display 14 when intersection point 206 is coincident with display object 31. Movement of the second body part towards the display may be determined based on a distance between second body part 202 relative to first body part 200. As the distance increases, movement towards the display may be inferred. As the distance decreases, movement away from the display may be inferred. Movement of second body part 202 towards the display may be based on the distance between the second body part and the display. In some examples, the user maintaining the second body part in the same X-Y position for a threshold time period may also constitute an input command.

In some embodiments and scenarios, the targeted object, optionally after selection by the user, may be activated. Activation may include execution of OS- or application-level code associated with the targeted object. For example, if the targeted object is a document, activation may include launching a word-processor which automatically opens the document for editing. If the targeted object is a slideshow, activation may include presenting the slideshow on the display. Gesture-recognition engine 34 may be configured to detect this type of activation gesture. In other examples, the user's intent to select or activate a targeted object may be signaled by a spoken word or phrase detected by speech-recognition engine 162.

Figure 7B:
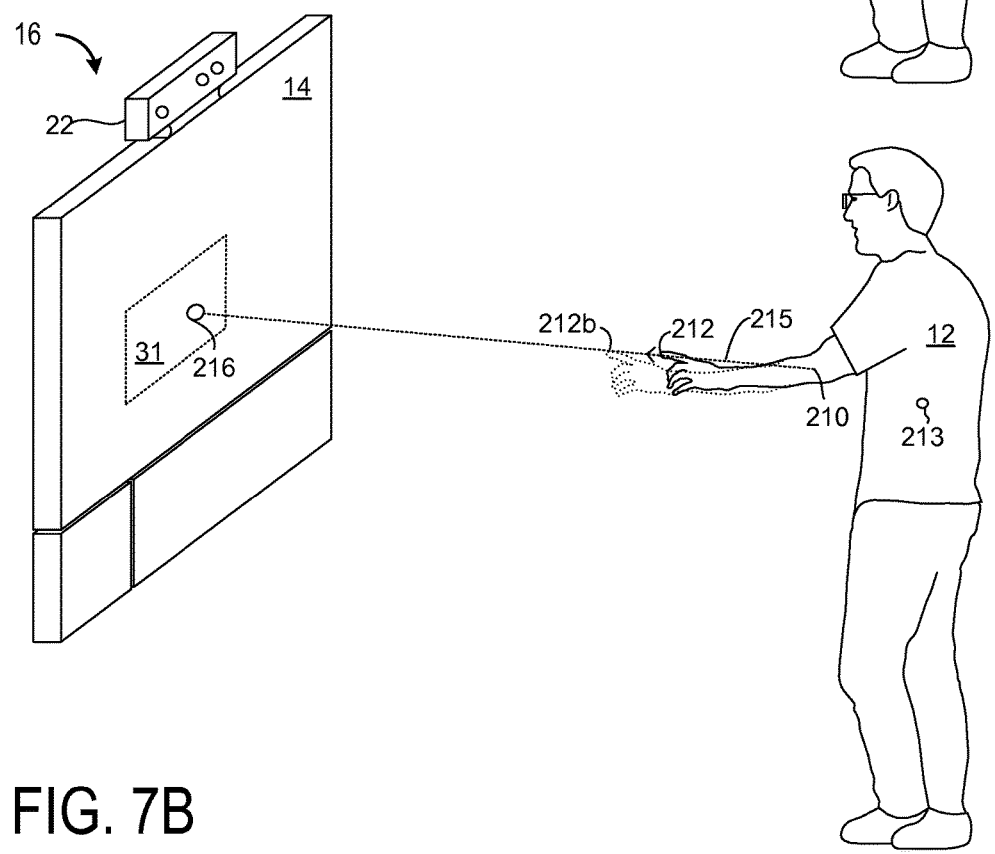
FIG. 7B shows a user targeting a display via arm-aimed pointing.

FIG. 7B shows another example of a user 12 pointing at display 14. In this example, the user's elbow is designated as first body part 210, while the user's finger is designated as second body part 212. The body of user 12 is assigned a center point 213. Ray 215 is extended from the user's elbow through the user's finger, and extended to display 14, as indicated by intersection point 216. In this manner, the user may target the display in a fashion akin to using a laser pointer. While display object 31 is coincident with intersection point 216, user 12 may select or provoke action on display object 31 by moving second body part 212 relative to display 14 (shown at 212a). Movement of the second body part towards the display may be determined based on a distance between the location of first body part 210 and/or the location of second body part 212 relative to the location of the user body center point 213.

User preferences may be established and stored on compute system 16 for line-of-sight pointing (as shown in FIG. 7A) and/or arm-aimed pointing (as shown in FIG. 7B), so that a user may use one or both types of pointing based on an application. Gesture-recognition engine 164 and eye-tracking engine 166 may be trained by machine learning or another technique to adjust the position of an intersection point on the display based on a user's habits. For example, if a user generally aims a ray at the display that is offset from a desired display object, the direction of the ray and/or the position of the intersection point may be compensated accordingly.

While the pointer mode of input may be preferable for a user in many scenarios, there may be other applications where a different mode of input is preferred. As such, compute system 16 may support multiple modes of input (herein "Physical Interaction Zones or PhIZ) and further support transitioning between the multiple PhIZs.

Figure 8:
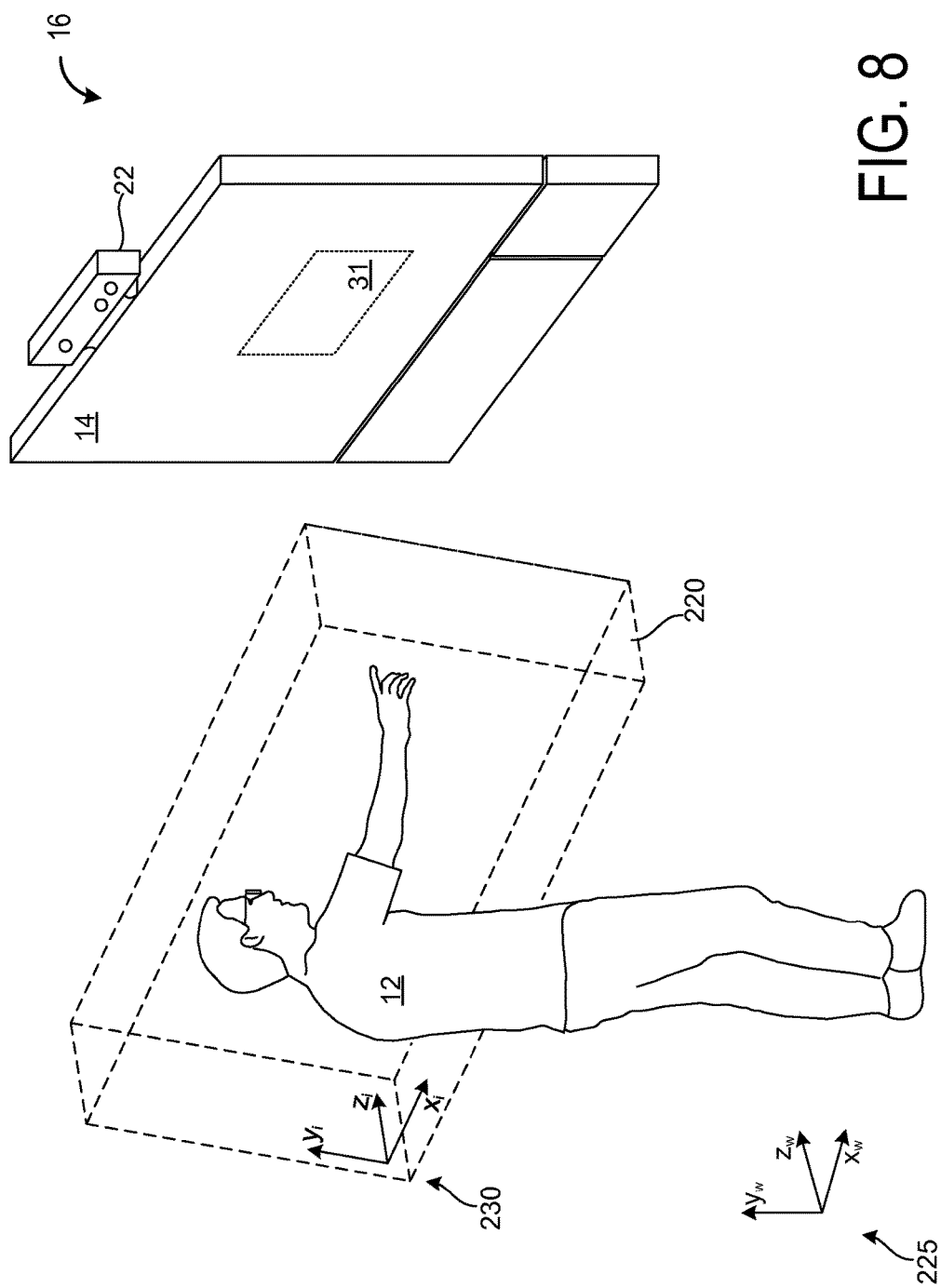
FIG. 8 shows a user providing input to a compute system via a physical interaction zone.

FIG. 8 shows an example of user 12 providing input to compute system 16 via an ergonomic PhIZ. An interaction zone 220 can be conceptualized in world space and instantiated in model space. The interaction zone can be configured to move with the user as the user moves in world space. As a consequence, a moveable interface-space coordinate system 225 of the instantiated interaction zone in an environment may change relative to the fixed environment coordinate system 230. Interaction zone 220 may be established with a position and orientation based on a position and orientation of user 12 (and/or a three-dimensional skeletal model of user 12). As the interaction zone tracks with the user, the interaction zone may remain directly in front of the user, as shown in FIG. 8, or in whatever spatial orientation is established. The user can move around and/or change orientations within the environment, and the interaction zone will automatically track with the user. Gesture commands by the user are thus determined with respect to the coordinates of the interaction zone and the position of the user, but not with respect to display 14 during this mode of operation.

Compute system 16 may thus be configured to translate the position of body parts of the user as either an interaction zone gesture or a pointing zone gesture under different conditions. For example, compute system 16 may receive a three-dimensional model defining a 6DoF pose of a display relative to a 6DoF pose of a depth camera within an environment, and may also receive a machine-readable body model of a user within the environment, the body model including a three-dimensional location of a first body part of the user, and three-dimensional location of a second body part of the user. During a first condition, the compute system may translate a position of the first body part of the user and a position of the second body part of the user into an interaction zone gesture. During a second condition, the compute system may translate a position of the first body part of the user and the position of the second body part of the user into a pointing gesture.

Compute system 16 may transition from the first condition to the second condition responsive to receiving a command from a user. For example, the user may issue a verbal command, or a gestural command (such as closing a non-dominant eye). The user may step and point towards the display to indicate a transition to the second condition. The user may provide input through other input or communication systems.

In some examples, compute system 16 may transition from the first condition to the second condition responsive to receiving instructions from an application executing on the computing system. The application may indicate the first or second condition based on context and/or display interface. For example, a game application may indicate certain tasks to be performed in the ergonomic PhIZ, while other tasks are to be performed in the pointer PhIZ. An application may present menus to be interacted with in the pointer PhIZ, while menu items, once selected, may be interacted with in the ergonomic PhIZ.

In some examples, compute system may transition from the first condition to the second condition responsive to recognizing that a distance of the second body part relative to the display has decreased below a threshold. For example, a user may extend a hand or finger towards display 14. When the hand or finger is within a threshold distance of the display, the pointer PhIZ may be invoked.

While the applications herein have been described with regard to a single display, multiple displays may be calibrated within an environment. A projection screen may be used as a display in some examples. In examples where the user is wearing an augmented reality device, such as head mounted display system 40, virtual displays may be presented to the user at three-dimensional locations within the environment. A user may interact with each display using the pointer PhIZ based on the position of the first and second body parts of the user relative to a display. The user need not interact with the nearest display; rather, any display within an environment may be targeted.

In some examples, pointer-projection engine 82 can be used to identify any targeted, real-world object in environment 10. Targeted objects may include remotely controllable devices like a cable box, A/V receiver, printer, or environmental control. The act of targeting and selecting such objects through pointer-projection engine 82 may have the effect of presenting a control interface of that device on display 14, enabling the user to control the device through NUI. For example, referring to FIG. 1, user 12 may point at lamp 112 to turn the lamp on or off, or to change a dimming setting. The targeting of any real-world object requires calibration of the location and pose of that object with regard to the environment, in a manner similar to that described herein for the calibration of a display. In other embodiments, a real-world object or display may be self-calibrating. Self-calibrating objects may include devices with built-in location and orientation tracking (via GPS and/or inertial sensors), and objects physically coupled to wireless location finders. The location and orientation of these objects within environment 10 may be computed locally and communicated to compute system 16, to effect calibration. A further advantage of this feature is that self-calibrating objects may stay calibrating even when moved within the environment.

In some embodiments, the methods and processes described herein may be tied to a computing system of one or more computing devices. In particular, such methods and processes may be implemented as a computer-application program or service, an application-programming interface (API), a library, and/or other computer-program product.

Referring to FIG. 4, which shows in simplified form a non-limiting example of a compute system 16 to enact the methods and processes described herein. The compute system includes a logic machine 238 and a storage machine 240. The compute system also includes a display 14, communication subsystem 242, and various components not shown the drawing.

Logic machine 238 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 240 includes one or more physical devices configured to hold instructions executable by the logic machine to implement the methods and processes described herein. When such methods and processes are implemented, the state of storage machine 240 may be transformed—e.g., to hold different data.

Storage machine 240 may include removable and/or built-in devices. Storage machine 240 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 240 may include volatile, nonvolatile, dynamic, static, read/write, read-only, random-access, sequential-access, location-addressable, file-addressable, and/or content-addressable devices.

It will be appreciated that storage machine 240 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 238 and storage machine 240 may be integrated together into one or more hardware-logic components. Such hardware-logic components may include field-programmable gate arrays (FPGAs), program- and application-specific integrated circuits (PASIC/ASICs), program- and application-specific standard products (PSSP/

ASSPs), system-on-a-chip (SOC), and complex programmable logic devices (CPLDs), for example.

The terms "module," "program," and "engine" may be used to describe an aspect of compute system 16 implemented to perform a particular function. In some cases, a module, program, or engine may be instantiated via logic machine 238 executing instructions held by storage machine 240. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display 14 may be used to present a visual representation of data held by storage machine 240. This visual representation may take the form of a graphical user interface (GUI). As the herein described methods and processes change the data held by the storage machine, and thus transform the state of the storage machine, the state of display 14 may likewise be transformed to visually represent changes in the underlying data. Display 14 may include one or more display devices utilizing virtually any type of technology. Such display devices may be combined with logic machine 238 and/or storage machine 240 in a shared enclosure, or such display devices may be peripheral display devices.

When included, communication subsystem 242 may be configured to communicatively couple compute system 16 with one or more other computing devices. Communication subsystem 242 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow compute system 16 to send and/or receive messages to and/or from other devices via a network such as the Internet.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and nonobvious combinations and subcombinations of the various processes, systems and configurations, and other features, functions, acts, and/or properties disclosed herein, as well as any and all equivalents thereof.

An example provides a method of calibrating a six-degrees-of-freedom (6DoF) pose of a natural user interface (NUI) camera relative to a display, the method comprising receiving, from a calibration camera, calibration video imaging an environment from a calibration perspective that sites the display and one or more features, three-dimensionally modeling, from the calibration video, a three-dimensional map of the environment, the three-dimensional map of the environment defining a 6DoF pose of the display within the environment and a three-dimensional location of each of the one or more features within the environment, receiving, from the NUI camera, primary video imaging the environment from an operation perspective that sites the one or more features, and finding a 6DoF pose of the NUI camera within the three-dimensional map of the environment based on the operation perspective view of the one or more features. In such an example, the method may additionally or alternatively comprise receiving, from the NUI camera, primary video imaging a user in the environment, identifying three-dimensional locations of a first body part of the user and a second body part of the user relative to the display, and visually indicating, on the display, an intersection point of the display and a ray extending from the first body part through the second body part. In such an example, the method may additionally or alternatively comprise translating movement of a second body part of a user towards the display as an input command directed to an object displayed at an intersection point of the display and a ray extending from a first body part of the user through the second body part. In such an example, movement of the second body part towards the display may additionally or alternatively be determined based on a distance between the second body part and a body of the user. In such an example, movement of the second body part towards the display may additionally or alternatively be determined based on a distance between the second body part and the first body part. In such an example, the method may additionally or alternatively comprise presenting a display object on the display, and may additionally or alternatively comprise selecting the display object responsive to movement of the second body part towards the display when the intersection point is coincident with the display object. In such an example, the first body part may additionally or alternatively be an eye of the user and the second body part may additionally or alternatively be a finger of the user. In such an example, the first body part may additionally or alternatively be an elbow of the user and the second body part may additionally or alternatively be a finger of the user. In such an example, the primary video may additionally or alternatively sites the calibration camera. In such an example, the calibration camera may additionally or alternatively include two or more reference markings visible to the NUI camera. In such an example, the calibration camera may additionally or alternatively include a display screen configured to present a reference image visible to the NUI camera. In such an example, the NUI camera may additionally or alternatively be a depth camera. In such an example, the display may additionally or alternatively be configured to present a calibration image visible to the calibration camera. In such an example, the calibration camera may additionally or alternatively be included in a head-mounted augmented reality device wearable by a user. Any or all of the above-described examples may be combined in any suitable manner in various implementations.

In another example, a method of using a depth camera to control a computing system is provided, the method comprising receiving, at the computing system, a three-dimensional model defining a 6DoF pose of a display relative to a 6DoF pose of the depth camera within an environment, receiving, at the computing system, a machine-readable body model of a user within the environment, the machine-readable body model including a three-dimensional location of a first body part of the user and a three-dimensional location of a second body part of the user, during a first condition, translating a position of the first body part of the user and a position of the second body part of the user into a physical interaction zone gesture that controls the computing system, and during a second condition, translating a position of the first body part of the user and a position of the second body part of the user relative to the display into a pointing gesture that controls the computing system. In such an example, the method may additionally or alternatively comprise transitioning from the first condition to the second condition responsive to receiving a command from the user. In such an example, the method may additionally or alternatively comprise transitioning from the first condition to the second condition responsive to receiving instructions from an application executing on the computing system. In such an example, the method may additionally or alternatively comprise transitioning from the first condition to the second condition responsive to recognizing that a distance of the second body part relative to the display has decreased below a threshold. In such an example, the method may additionally or alternatively comprise, during the second condition, visually indicating, on the display, an intersection point of the display and a ray extending from the first body part through the second body part. Any or all of the above-described examples may be combined in any suitable manner in various implementations.

In yet another example, a method of calibrating a six-degrees-of-freedom (6DoF) pose of a natural user interface (NUI) camera relative to a display is provided, the method comprising receiving, from the NUI camera, calibration video imaging an environment from a calibration perspective that sites the display and one or more features. In such an example, the method may additionally or alternatively comprise three-dimensionally modeling, from the calibration video, a three-dimensional map of the environment, the three-dimensional map of the environment defining a 6DoF pose of the display within the environment and a three-dimensional location of each of the one or more features within the environment. In such an example, the method may additionally or alternatively comprise receiving, from the NUI camera, primary video imaging the environment, from an operation perspective that sites the one or more features, and may additionally or alternatively comprise finding a 6DoF pose of the NUI camera within the three-dimensional map of the environment based on the operation perspective view of the one or more features. Any or all of the above-described examples may be combined in any suitable manner in various implementations.

The invention claimed is:

1. A method of calibrating a six-degrees-of-freedom (6DoF) pose of a natural user interface (NUI) camera relative to a display:
receiving, from a calibration camera, calibration video imaging an environment from a calibration perspective that sites the display and one or more features;
three-dimensionally modeling, from the calibration video, a three-dimensional map of the environment, the three-dimensional map of the environment defining a 6DoF pose of the display within the environment and a three-dimensional location of each of the one or more features within the environment;
receiving, from the NUI camera, primary video imaging the environment from an operation perspective that sites the one or more features; and
finding a 6DoF pose of the NUI camera within the three-dimensional map of the environment based on the operation perspective view of the one or more features.

2. The method of claim 1, further comprising:
receiving, from the NUI camera, primary video imaging a user in the environment;
identifying three-dimensional locations of a first body part of the user and a second body part of the user relative to the display; and
visually indicating, on the display, an intersection point of the display and a ray extending from the first body part through the second body part.

3. The method of claim 1, further comprising:
translating movement of a second body part of a user towards the display as an input command directed to an object displayed at an intersection point of the display and a ray extending from a first body part of the user through the second body part.

4. The method of claim 3, wherein movement of the second body part towards the display is determined based on a distance between the second body part and a body of the user.

5. The method of claim 3, wherein movement of the second body part towards the display is determined based on a distance between the second body part and the first body part.

6. The method of claim 3, further comprising:
presenting a display object on the display; and
selecting the display object responsive to movement of the second body part towards the display when the intersection point is coincident with the display object.

7. The method of claim 2, wherein the first body part is an eye of the user and the second body part is a finger of the user.

8. The method of claim 2, wherein the first body part is an elbow of the user and the second body part is a finger of the user.

9. The method of claim 1, wherein the primary video sites the calibration camera.

10. The method of claim 9, wherein the calibration camera includes two or more reference markings visible to the NUI camera.

11. The method of claim 9, wherein the calibration camera includes a display screen configured to present a reference image visible to the NUI camera.

12. The method of claim 1, wherein the NUI camera is a depth camera.

13. The method of claim 1, wherein the display is configured to present a calibration image visible to the calibration camera.

14. The method of claim 1, wherein the calibration camera is included in a head-mounted augmented reality device wearable by a user.

15. A method of calibrating a six-degrees-of-freedom (6DoF) pose of a natural user interface (NUI) camera relative to a display:
receiving, from the NUI camera, calibration video imaging an environment from a calibration perspective that sites the display and one or more features;
three-dimensionally modeling, from the calibration video, a three-dimensional map of the environment, the three-dimensional map of the environment defining a 6DoF pose of the display within the environment and a three-dimensional location of each of the one or more features within the environment;

receiving, from the NUI camera, primary video imaging the environment, from an operation perspective that sites the one or more features; and finding a 6DoF pose of the NUI camera within the three-dimensional map of the environment based on the operation perspective view of the one or more features.

* * * * *